Smith & Coder.
Harvester Cutter.
No. 94,251. Patented Aug. 31. 1869.
Fig: 1
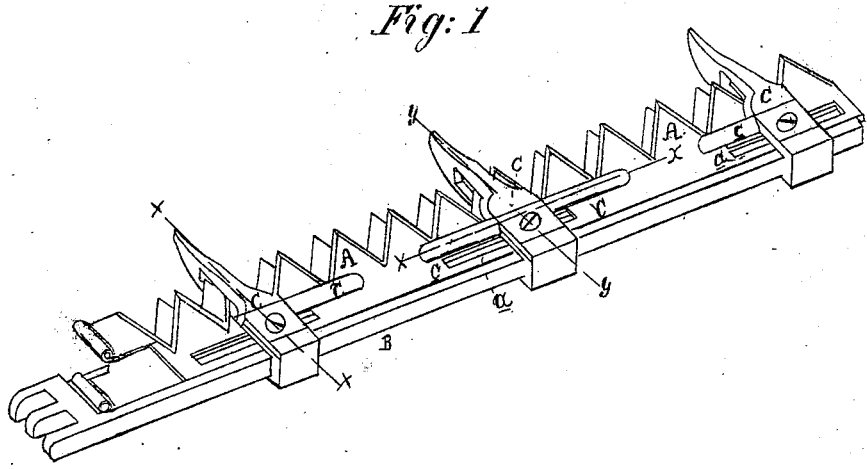
Fig: 2 Fig: 3
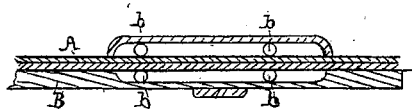 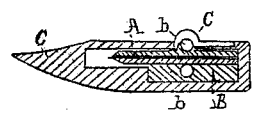
Fig: 4
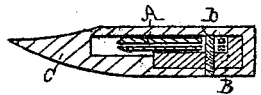
James S. Smith
John Coder
Inventors.
Attest.

United States Patent Office.

JAMES S. SMITH AND JOHN CODER, OF SWANTON, OHIO.

Letters Patent No. 94,251, dated August 31, 1869.

IMPROVEMENT IN HARVESTER-CUTTERS.

The Schedule referred to in these Letters Patent and making part of the same.

*To whom it may concern:*

Be it known that we, JAMES S. SMITH and JOHN CODER, of Swanton, in the county of Lucas, and State of Ohio, have invented a new and useful Improvement in Cutters or Knives and Sickle-Bars to be Attached to Harvesters; and we do declare that the following is a true and accurate description thereof, reference being had to the accompanying drawings, and to the letters of reference marked thereon, and being a part of this specification.

Figure 1 is a perspective view of our invention.

Figure 2 is a longitudinal section on the line $x$-$x$ in fig. 1.

Figure 3 is a transverse section on the line $y$-$y$ in fig. 1.

Figure 4 is a section through line $x$-$x$, fig. 1.

Like letters indicate like parts in each figure.

The nature of this invention relates to an improvement in that class of machines known as mowing-machines, reapers, or harvesters, and consists of employing two sets of cutters, metallic shoes, with vertical guides, and anti-friction bearings, and the peculiar arrangement of the various parts.

A represents double knives or cutters, one resting on the top of the other, both having triangular teeth, with a base of about three inches, and bevelled edges to the same, and oblong openings, $a$, at each end and in the middle, for the guide or upright of the shoe to pass through. The under knife is about three inches longer than the upper one. Each may be made of one piece, like a saw, or in sections, for each tooth. These cutters or knives receive an independent reciprocating motion, by means of connecting-rods attached to their inner ends, and a hinge-joint from the motive-power of the machine to which they may be attached, and thereby each has both a draw and shear-cut. The length of play given each knife, is the distance of the base of two of their teeth, thus giving increased cutting-capacity, and enabling them to sever, with facility and rapidity, with the use of smaller amount of power than is required by single-knife machines, the grass or other similar substance brought in contact with them. These knives may be used on the so-called single-knife machines, by disconnecting, and fixing stationary the under one, and giving motion to the upper one only.

B represents a finger-bar, made in the ordinary form, used on harvesting or mowing-machines, except that fingers are not required for each tooth of the knife, as in single-knife machines. On the upper surface of this bar, near the back of the same, are cut sockets, of an oblong shape, one at each end, on the inner side of the upright or guide, and two near the middle, on each side of the middle upright or shoe-guide, in which are placed balls 6, of rubber or metal, or their equivalents, to serve as anti-friction bearings or rollers.

C represents iron shoes, placed on the under side of the finger-bar B, one near each end, and one in the middle.

Near the heel of each shoe is an upright or guide, $b$, which passes up through the sickle-bar and the oblong openings $a$ in the knives, forming guides for the same.

On the top of the upright, by means of a screw, is fastened an arm or bar, $c$, which, on those at each end of the bar B, projects inward, and on the middle one, projects on each side, forming a T. On the under side of these arms are cut oblong sockets, in which, when the knives are in position, are placed balls of rubber, metal, or their equivalents, as anti-friction bearings or rollers, same as in the bar B. These arms and rollers hold the upper knife down in its place, and are yet sufficiently elastic to avoid danger of breakage, should the cutters come in contact with any hard substance.

What we claim, and desire to secure by Letters Patent, is—

1. The metallic shoe C, with the uprights or guides, extended arms $c$, and the anti-friction balls or roller-bearings 6, when constructed and operating substantially as herein described.

2. The combination and arrangement of the double cutters or knives A, finger-bar B, metallic shoes C, with uprights or guides, extended arms $c$, and anti-friction ball or roller-bearings 6, when constructed and operating substantially as herein set forth.

JAMES S. SMITH,
JOHN CODER.

Witnesses:
C. E. BLIVEN,
SAMUEL HERMAN.